US 8,954,872 B2

(12) United States Patent
Orr et al.

(10) Patent No.: US 8,954,872 B2
(45) Date of Patent: Feb. 10, 2015

(54) METHOD AND APPARATUS FOR CONFIGURING A PLURALITY OF DISPLAYS INTO A SINGLE LARGE SURFACE DISPLAY

(75) Inventors: Stephen J. Orr, Markham (CA); Christina M. Elder, Pickering (CA); Wenzhan Xie, Toronto (CA); Jianping Ji, Markham (CA)

(73) Assignee: ATI Technologies ULC, Markham, Ontario (CA)

( * ) Notice: Subject to any disclaimer, the term of this patent is extended or adjusted under 35 U.S.C. 154(b) by 937 days.

(21) Appl. No.: 12/546,653

(22) Filed: Aug. 24, 2009

(65) Prior Publication Data
US 2011/0047489 A1 Feb. 24, 2011

(51) Int. Cl.
G06F 3/00 (2006.01)
G06F 3/0482 (2013.01)
G06F 3/14 (2006.01)
G09G 5/395 (2006.01)

(52) U.S. Cl.
CPC ............ *G06F 3/0482* (2013.01); *G06F 3/1446* (2013.01); *G09G 5/395* (2013.01); *G09G 2356/00* (2013.01); *G09G 2370/042* (2013.01)
USPC .......................................... 715/764; 345/1.3

(58) Field of Classification Search
USPC .......................................... 715/764; 345/1.3
See application file for complete search history.

(56) References Cited

U.S. PATENT DOCUMENTS 5,585,821 A * 12/1996 Ishikura et al. ............... 715/856
5,687,334 A * 11/1997 Davis et al. ................... 715/764
5,923,307 A * 7/1999 Hogle, IV ......................... 345/4
6,018,340 A 1/2000 Butler et al.
6,084,553 A * 7/2000 Walls et al. .................... 715/781
6,104,359 A 8/2000 Endres et al.
6,411,302 B1 * 6/2002 Chiraz ............................ 345/545
2003/0048275 A1 * 3/2003 Ciolac ............................ 345/544
2003/0107767 A1 * 6/2003 Ishizaki ....................... 358/1.18
2006/0190817 A1 * 8/2006 Banks ........................... 715/526
2007/0120763 A1 * 5/2007 De Paepe et al. ............... 345/1.3
2007/0283285 A1 * 12/2007 Buchmann ..................... 715/764
2008/0309644 A1 * 12/2008 Arimoto ....................... 345/173
2009/0300541 A1 * 12/2009 Nelson .......................... 715/799
2010/0138768 A1 * 6/2010 Lonkar et al. ................. 715/769
2010/0138780 A1 * 6/2010 Marano et al. ................ 715/804
2010/0149102 A1 * 6/2010 Onda et al. .................... 345/168

OTHER PUBLICATIONS

MultiMonitor Support and Windows Vista, updated Nov. 8, 2006: http://www.microsoft.com/whdc/device/display/multimonVista.mspx.

(Continued)

*Primary Examiner* — Ryan Pitaro
(74) *Attorney, Agent, or Firm* — Faegre Baker Daniels LLP (57) ABSTRACT

A method is disclosed that provides, by mapping logic, output to a selected display of a plurality of displays forming an arrangement, where the selected display provides a visual indication in response to the output. The visual indication indicates that the selected display is ready to be mapped to an image data portion corresponding to the selected display's physical position within the arrangement. The method maps the image data portion to the selected display. The image data portion is stored in a frame buffer, and is mapped in response to input indicating the selected display's physical position. The frame buffer stores a single large surface image as a plurality of image data portions, where each image data portion is mapped to a corresponding display of the plurality of displays. An apparatus is also disclosed, that operates in accordance with the method.

23 Claims, 5 Drawing Sheets

(56) References Cited

OTHER PUBLICATIONS

Understanding Multiple Monitors: http://windows.microsoft.com/en-us/windows-vista/Understanding-multiple-monitors.

How to Configure and Use Multiple Monitors in Windows XP, Article ID: 307873, Last Review: Jul. 15, 2004, Revision 2.4: http://support.microsoft.com/kb/307873.

Northrup, Tony. Using Multiple Monitors with Windows XP. Jul. 26, 2004: http://www.microsoft.com/windowsxp/using/setup/learnmore/northrup_multimon.mspx.

Multiple Monitors: Frequently Asked Questions: http://windows.microsoft.com/en-US/windows-vista/Multiple-monitors-frequently-asked-questions.

Screen Capture of Control Panel Display Properties, Microsoft Windows XP Professional, Version 2002, Service Pack 3.

*To arrange multiple monitors*, Microsoft Windows Help and Support, Microsoft Windows XP Professional, Version 2002, Service Pack 3.

\* cited by examiner

METHOD AND APPARATUS FOR CONFIGURING A PLURALITY OF DISPLAYS INTO A SINGLE LARGE SURFACE DISPLAY

FIELD OF THE DISCLOSURE

The present disclosure is related to systems having multiple displays wherein the multiple displays may be used to display a single image over the surface area of the combined displays.

BACKGROUND

Various applications, such as gaming applications, may use multiple displays to increase the area over which visual information may be displayed. That is, a group of monitors may be arranged to form a single large surface that can display a partitioned image. The ability to drive multiple displays is beginning to allow a number of new display combinations. Such existing combinations include any combination of "cloned" displays, where more than one display shows the same desktop, and extended displays, where each display contains a different desktop. Other modes are also enabled by the driving of multiple displays, such as modes sometimes called "Very Large Desktop" (VLD), and Stretch mode or Span Mode. VLD for example, allows two or more displays to display a single desktop, and utilizes two or more GPUs coupled to the rendering ability of one GPU to drive the two or more displays (i.e. 4, 6, 8 or more). Stretch or Span Mode allows two displays to display a single desktop using a single GPU. Some existing products enable up to three displays to operate in concert.

When a display is cloned or duplicated there is no need to physically arrange the displays as both displays show the same image. When multiple displays are in an extended mode they can be arranged in the operating system control panel to place the desktops relative to one another. For the simpler Span Mode and Stretch Mode solutions it was relatively easy for a user to arrange the physical location of the display, or configure the software to swap the relative positions of the display, because there were only two displays involved. With VLD modes, the end user is responsible for physically repositioning the displays (or changing the display connections) to achieve the correct display arrangement. This is an inconvenient and time consuming problem. If multiple displays are associated with a single desktop, and as the number of displays and the complexity of the potential arrangements increases, it becomes necessary to provide methods to assist in configuring the physical arrangement of the displays. That is, as the number of displays being used in concert increases to four or more displays, the number of incorrect combinations that can occur with respect to the physical arrangement of the displays is large, and therefore a user needs assistance in arranging the displays.

However currently, in order to create the correct arrangement of displays, the user must physically move the displays to the proper physical position and/or change the cabling arrangement of individual displays to create the desired arrangement. This procedure is currently used when setting up a plurality of displays to operate in VLD modes.

Therefore a need exists for methods and apparatuses to configure the physical arrangement of a group of displays participating in a single large surface.

DETAILED DESCRIPTION

The present disclosure provides apparatuses, systems and methods related to the ability to drive multiple displays, for example up to six independent displays, or more, which allow a number of new display combinations. The embodiments disclosed provide for configuring a group of displays as a Single Large Surface (SLS) in which the group in concert forms a single large display. For example, each display may provide an integer fraction of an overall desktop size. For example, each of 4 displays may each provide 1920×1200 pixel resolution which is then arranged as a 2×2 grid which displays a 3840×2400 desktop. Another arrangement may be a 4×1 grid which leads to a 7680×1200 desktop. Although the exemplary embodiments disclosed herein involve a rectangular grid for simplicity of explanation, other implementations are possible in accordance with the embodiments. Other exemplary display arrangements that may be obtained in accordance with the embodiments include, but are not limited to: 1 wide by 3 high, 2 wide by 2 high, and 3 wide by 2 high. That is, the embodiments support a number of arrangements including various single row, and multiple row topologies.

The various embodiments disclosed herein include a method that provides, by mapping logic, output to a selected display of a plurality of displays forming an arrangement. The selected display provides a visual indication in response to the mapping logic output, and thereby indicates that it is ready to be mapped to an image data portion corresponding to its physical position within the arrangement. The mapping logic then maps an image data portion to the selected display. The image data portion is stored in a frame buffer and is mapped to the selected display in response to input (e.g., user input, input from an application or operating system, etc.) indicating the selected display's physical position. The frame buffer stores an image as a plurality of image data portions, where each image data portion is mapped to a corresponding display of the plurality of displays. The method therefore unscrambles an image on an SLS that is scrambled due to the initial physical order (and corresponding default image data portion mapping) of the displays in the physical arrangement.

The method may also provide the output to each display of the plurality of displays in a sequence, wherein each display to which the output is directed is the "selected display" when it provides (in response to the mapping logic output) a visual indication. The method then obtains input indicating each selected display's physical position, for each display of the plurality of displays, in order corresponding to the sequence.

In one embodiment, the method provides a user interface on at least one display of the plurality of displays, wherein the user interface includes a plurality of visual objects. Each visual object of the plurality of visual objects corresponds to a display of the plurality of displays and the visual objects are arranged to correspond with the arrangement of the plurality of displays. The method may then obtain input corresponding to selection of a visual object, where the selected visual object corresponds to the selected display's physical position within the arrangement. The method may also include obtaining input defining the display arrangement, and providing the plurality of visual objects arranged to correspond with the display arrangement.

In some embodiments, the selected display may provide a visual indication in response to the mapping logic output, as one of lighting the selected display or changing background color of the selected display. The method may also provide a first output to blank out all displays of the plurality of displays in the arrangement, prior to providing the output to the selected display for providing the visual indication.

In one embodiment, the method may provide a plurality of visual objects as a grid of cells, wherein each cell in the grid of cells is a "visual object" and corresponds to a physical position of a display of the plurality of displays making up the arrangement. The method may obtain input corresponding to selection of a cell of the grid, where the selected cell corresponds to the physical position of the selected display in the display arrangement.

In one embodiment, the method may provide the visual indication by providing a unique alphanumeric character on each display of the plurality of displays at the same time, such that all displays are "selected displays," that is, ready for mapping. Each alphanumeric character corresponds to an initial frame buffer mapping of a corresponding display on which the alphanumeric character is displayed. This may, in some embodiments, be a "default mapping" that corresponds to, for example, the physical connector ports to which each display is connected. The method may then receive a string of alphanumeric characters as the input, where the string is in order of the physical arrangement of the plurality of displays. That is, the apparatus corrects or remaps the initial mapping.

The disclosed embodiment also provide an apparatus with mapping logic that is operative to provide a configuration interface for a plurality of displays forming an arrangement. The mapping logic provides output to a selected display of the plurality of displays, and the selected display provides a visual indication in response to the output. The visual indication indicates that the selected display is ready to be mapped to an image data portion corresponding to the selected display's physical position within the arrangement. The mapping logic may then map the image data portion to the selected display in response to input indicating the selected display's physical position. The image data portions are stored in a frame buffer, which stores an image as a plurality of image data portions, where each image data portion is mapped to a corresponding display of the plurality of displays.

The apparatus may further include a plurality of physical display connectors, operatively connected to the mapping logic, and operative to connect to the plurality of displays. Each connector corresponds to a display, and, in some embodiments, may be initially mapped, as a default mapping, to one of the image data portions of the frame buffer.

The apparatus mapping logic may also be operative to provide output to each display of the plurality of displays in a sequence, where each display to which the output is directed is the "selected display" when it provides a visual indication. The mapping logic may obtain input corresponding to each selected display's physical position for each display of the plurality of displays in order corresponding to said sequence. This allows a user to easily configure single large surface displays having four or more displays without having to perform any disconnecting/reconnecting of displays after the displays have been connected and arranged.

In some embodiments, the apparatus mapping logic may be operative to provide a user interface on at least one display of the plurality of displays, where the user interface includes a plurality of visual objects. Each visual object corresponds to a display of the plurality of displays and the visual objects are arranged to correspond with the arrangement of the plurality of displays. The mapping logic may then obtain input corresponding to selection of a visual object corresponding to the selected display's physical position within the arrangement. Further in some embodiments the mapping logic may be operative to obtain input defining the arrangement of the plurality of displays, and provide the plurality of visual objects arranged to correspond with the defined arrangement.

The apparatus mapping logic may provide output so that the selected display provides a visual indication by one of lighting the selected display or changing its background color. The mapping logic may also provide a first output to blank out all displays prior to providing the output to the selected display to provide the visual indication.

In some embodiments, the apparatus mapping logic may be operative to provide the plurality of visual objects as a grid of cells, wherein each cell in the grid of cells is a visual object and corresponds to a physical position of a display of the plurality of displays. The mapping logic may then obtain input corresponding to selection of a cell of the grid of cells, where the cell corresponds to the physical position of the selected display.

In some embodiments, the visual indication may include display of a unique alphanumeric character on each display, such that all displays are "selected displays," and where each alphanumeric character corresponds to an initial frame buffer mapping of a corresponding display on which the alphanumeric character is displayed. The mapping logic may then obtain a string of alphanumeric characters as input, where the string is in order of the physical arrangement of the plurality of displays.

The embodiments herein disclosed also include a computer readable memory storing executable instructions for execution by at least one processor, that when executed cause the at least one processor to provide a configuration interface for a plurality of displays forming an arrangement, and provide output to a selected display of the plurality of displays, where the selected display provides a visual indication in response to the output, the visual indication indicating that the selected display is ready to be mapped to an image data portion corresponding to the selected display's physical position within the arrangement. The executable instructions further cause the at least one processor to map the image data portion to the selected display in response to input indicating the selected display's physical position. The image data portion is stored in a frame buffer, where the frame buffer stores an image as a plurality of image data portions, and where each image data portion is mapped to a corresponding display of the plurality of displays. The computer readable medium may be any suitable computer readable medium such as, but not limited to, a server memory, CD, DVD, or other non-volatile memory that may store and provide code to be executed by one or more processors.

Figure 1:
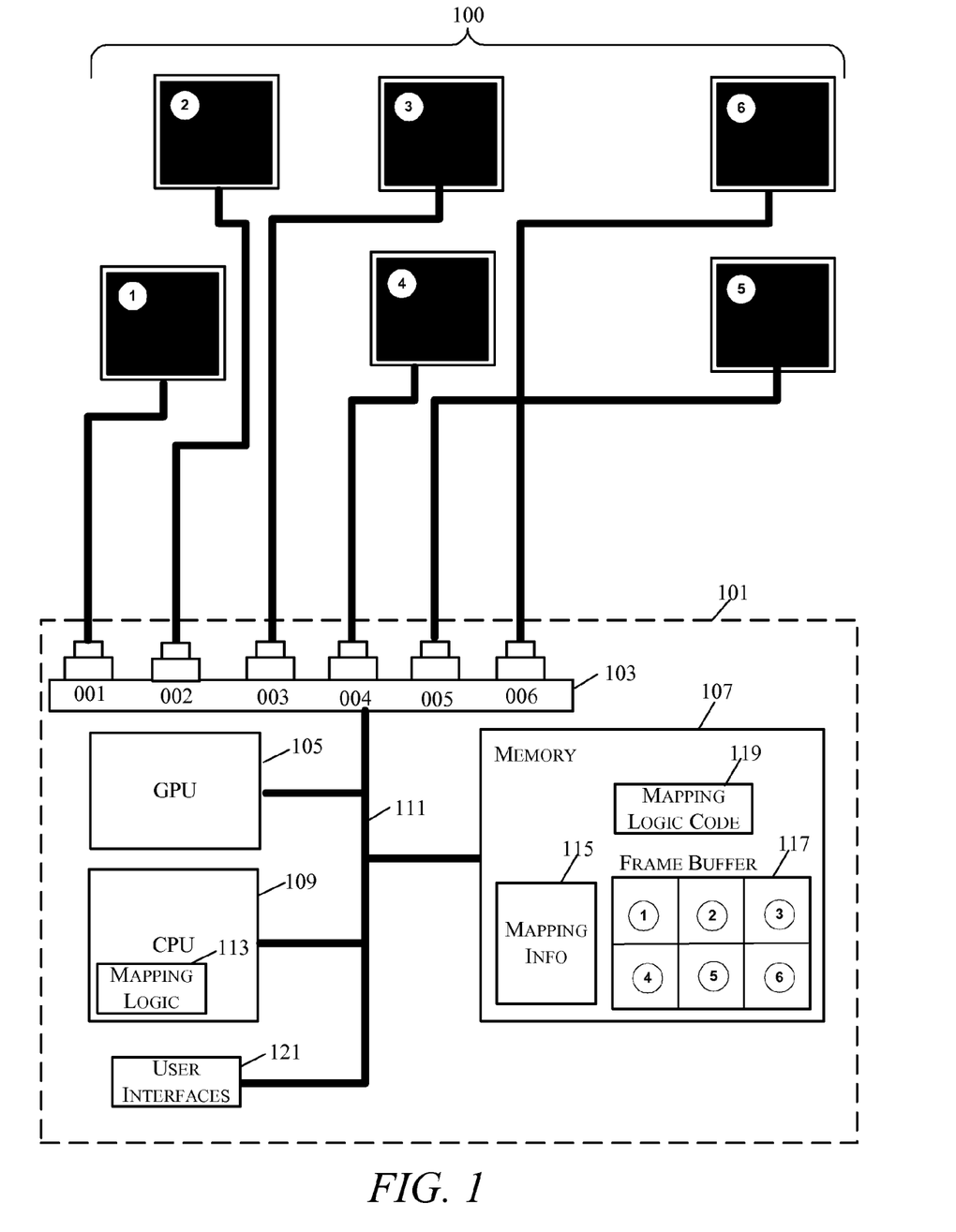
FIG. 1 is a block diagram illustrating an apparatus in accordance with an embodiment, connected to a plurality of displays where the plurality of displays form an arrangement.

Turning now to the drawings wherein like numerals represent like components, FIG. 1 is a block diagram of an apparatus connected to a plurality of displays in accordance with the various embodiments. In the exemplary embodiment illustrated in FIG. 1, the plurality of displays 100 includes six displays. A set of connector ports 103 includes six connectors labeled 001 thru 006. As shown in FIG. 1, the plurality of displays 100 is arranged in a rectangular arrangement having three columns and two rows. The displays as illustrated in FIG. 1, include a numerical reference number in the upper left hand corner which corresponds to the connector port number of the set of connector ports 103. For example as shown in FIG. 1, display 1 is shown connected to port 001. Likewise, display 2 is connected to connector port 002, etc. Although, in the exemplary embodiment shown in FIG. 1, the plurality of displays 100 is connected to the set of connector ports 103 via cabling, the set of connector ports 103 may also be wireless. Therefore, in some embodiments, the plurality of displays 100 may be wirelessly connected to a set of wireless connector ports. Further, in other embodiments, the plurality of displays 100 may be connected by a combination of wired/cable and wireless connection ports. Therefore the set of connector ports 103 may, in the various embodiments, be cable type connectors, wireless connectors, or a combination of cable and wireless connectors. In still other embodiments, some, or all, displays of the plurality of displays 100 may be "daisy-chained" such that only one or two displays of a daisy-chain is connected directly to the set of connector ports 103. In the embodiments employing daisy-chained displays, the displays are still assigned a logical port number which corresponds to an initial expected position. These initial expected positions (or logical port numbers) are initially mapped to image data portions of a frame buffer as is described further below. That is, the logical port numbers may be used to create a default mapping (initial mapping or initial expected positions) of image data portions to each connected display.

The set of connector ports 103 is shown included in the apparatus 101, which may be a single multi-layer PC board in some embodiments. In other embodiments, the apparatus 101 may be a computer system consisting of multiple PC boards such as a graphics processing card and a mother board which includes the central processing unit 109. However, in other embodiments, the apparatus 101 may be an integrated single PC board that includes both the central processing unit 109 and the graphics processing unit 105. Memory 107 is a representation of system memory which may be in any suitable location within the apparatus 101.

Other necessary components, as understood by those of ordinary skill, may also be present within the apparatus 101. Therefore, it is to be understood that, in addition to the items shown which are for the purpose of explaining to those of ordinary skill how to make and use the various embodiments herein disclosed, other components may be present as would be required and as would be understood by one of ordinary skill to be present such that the apparatus 101 will be a fully functional apparatus. For example, a memory controller may be present and may interface between, for example, the central processing unit 109 and memory 107. However such additional components are not shown as they are not necessary for providing an understanding of the presently disclosed embodiments.

Therefore in accordance with an embodiment, the apparatus 101 includes central processing unit 109, the graphics processing unit 105 and memory 107, all of which are operatively coupled by a communication bus 111. As discussed above, the communication bus 111 may include other components which are not shown but would be necessary to the operation of the apparatus 101 as would be understood by those of ordinary skill. The plurality of display ports 103 is also operatively connected to the communication bus 111 and is therefore also operatively connected to the central processing unit 109, the graphics processing unit 105 and the memory 107. The memory 107 includes a frame buffer 117.

As shown in FIG. 1, the frame buffer 117 is partitioned into a set of image data portions. For example, as shown, the frame buffer 117 includes six image data portions which may be considered similar to windowpanes in a large rectangular window. The rectangular arrangement is set up to correspond with the physical arrangement of the plurality of displays 100 that is initially expected. This initially expected arrangement, and corresponding initial mapping of displays to the frame buffer, may be based on, for example, the logical designations of the physical ports to which each of the plurality of displays 100 is connected. As discussed above, some embodiments may employ daisy-chained displays in which case such daisy-chained displays will likewise have "initially expected" logical positions that are similarly initially mapped to the frame buffer 117. In other words, when a group of displays is initially connected, via any suitable means, (cables, wireless ports, daisy-chaining, or combinations thereof), each display is initially mapped to an image data portion of the frame buffer. This mapping may be considered a default mapping based simply on the physical connections. However, if the displays are arranged in an order that differs from the expected or default order, the image displayed by the group will appear out of order and therefore will appear scrambled. The user may then therefore perform a configuration operation, in accordance with the embodiments, to correct the mapping of the frame buffer to match the actual physical arrangement of the plurality of displays 100 and thereby unscramble the displayed image. Of course, such a scrambled image need not be initially actually displayed. However imagining the appearance of such a scrambled image is helpful toward understanding the operation of the various embodiments.

Figure 2:
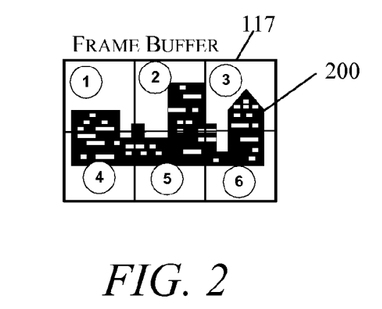
FIG. 2 illustrates a frame buffer which stores an image as a plurality of image data portions wherein each image data portion corresponds to a display of a plurality of displays.
Figure 3:
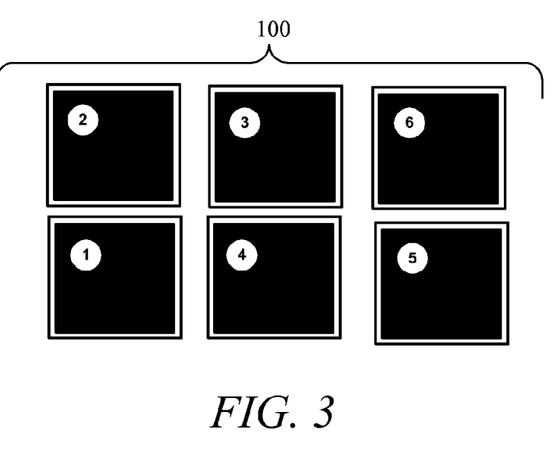
FIG. 3 illustrates a plurality of displays arranged in a rectangle having two rows and three columns.

FIG. 2 shows further details of the frame buffer 117 which partitions an exemplary image of a city skyline 200 into a set of six image data portions as shown. Returning to FIG. 1, the plurality of displays 100 is arranged in a similar rectangular arrangement. However the numerical indices shown on the displays correspond only to the physical connector ports of the plurality of connector ports 103. That is, as shown, the first row of displays consists of display 2, 3 and 6. The second row of displays consists of display 1, 4 and 5. However the frame buffer 117 expects to display the portion of image 200 corresponding to logical image data portion 1 on display 1. FIG. 3 is representative of the rectangular physical arrangement of the plurality of displays 100. As can be seen from the comparison of FIG. 2 to FIG. 3, the image 200 would be chopped up and mapped to the displays, which are in a different order than the current mapping order of the frame buffer. Therefore, the image would initially appear out of order or scrambled on the displays, such as an unarranged puzzle might appear. Therefore the frame buffer must somehow be made aware of the actual physical position of each display of the plurality of displays 100 shown in FIG. 3 so that the correct portions of the image 200 may be displayed in the correct physical display positions. In other words, the logical image data portions 1 thru 6 of the frame buffer 117 must be mapped to the correct displays corresponding to their actual physical positions within the display arrangement so that the image 200 will be correctly displayed.

Returning again to FIG. 1, the memory 107 is shown to include the mapping information 115. The mapping information 115 is used by the central processing unit 109, and/or the graphics processing unit 105, to correctly display the logical image data portions of the frame buffer 117 on the correct displays of the plurality of displays 100 with respect to the displays' actual physical location. In accordance with the embodiments, the mapping logic 113 provides a user interface and obtains user data so that the mapping of the displays' physical positions to the frame buffer may be accomplished to create the mapping information 115. In some embodiments, the mapping logic 113 may also use the mapping logic code 119. That is, the central processing unit 109 may execute the mapping logic code 119 from the memory 107 in some embodiments. In other embodiments the mapping logic 113 may operate independently, that is, without any mapping logic code 119.

The term "logic" as used herein may include software and/or firmware executing on one or more programmable processors (including CPUs and/or GPUs), and may also include ASICs, DSPs, hardwired logic or combinations thereof. Therefore, in accordance with the embodiments, the mapping logic may be implemented in any appropriate fashion and would remain in accordance with the embodiments herein disclosed. The term "display" as used herein refers to a device (i.e. a monitor) that displays an image or images, such as, but not limited to, a picture, a computer desktop, a gaming background, a video, an application window etc. The term "image" as used herein refers generally to what is "displayed" on a display (such as a monitor) and includes, but is not limited to, a computer desktop, a gaming background, a video, an application window etc. An "image data portion" as used herein corresponds to a logical partition of an image that may be mapped to at least one display of a plurality of displays. The mapping of image data portions to displays within an arrangement of a plurality of displays enables the plurality of displays to act in concert as a single large surface display.

Figure 4:
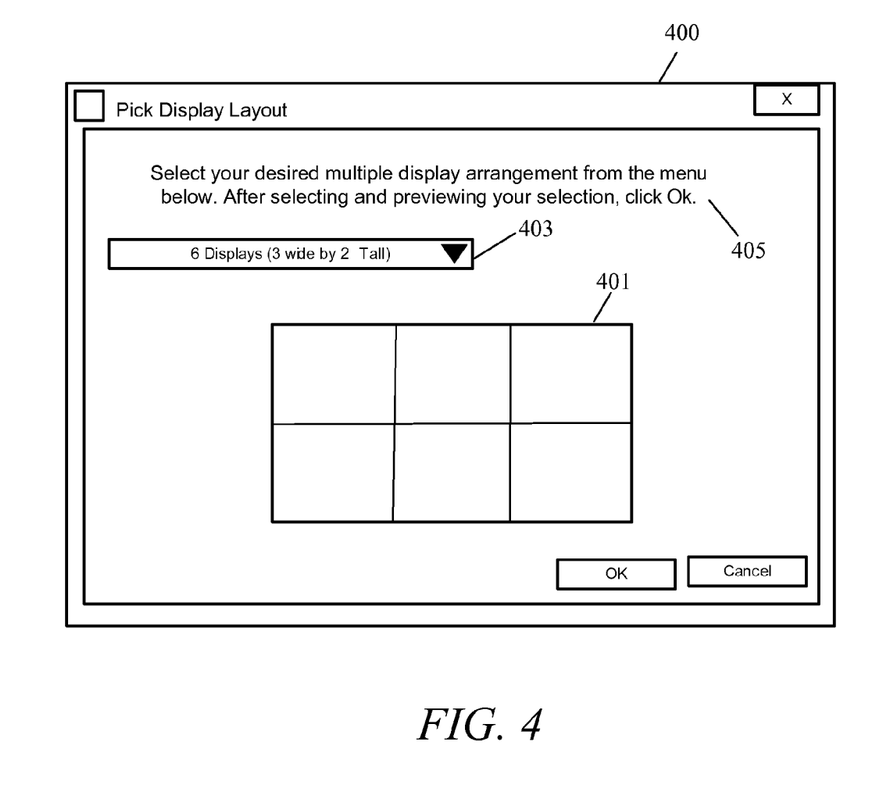
FIG. 4 illustrates a user interface which may be displayed on at least one display of the plurality of displays.

FIG. 4 illustrates a user interface in accordance with an embodiment. The user interface 400 may be displayed on one or more of the plurality of displays 100. The user interface 400 provides a plurality of visual objects 401. Each of the visual objects 41 corresponds to one of the displays of the plurality of displays 100 within the arrangement. As shown in FIG. 4, the user interface may include various features such as the instruction text 405 and pull down menu 403. An exemplary feature of the various embodiments provides the pull down menu 403, such that a user may select, and thereby specify or define, various physical arrangements of displays. For example, the user may have selected a six display configuration having three displays wide by two displays tall as shown. This corresponds to the physical arrangement of the plurality of displays 100 illustrated in FIG. 3. However other display configurations could also have been possible, such as, but not limited to, three rows of 2 displays by 2 columns of three displays. Therefore the user interface 100 may obtain user input corresponding to, and specifying or defining, the physical arrangement of the plurality of displays 100. The mapping logic 113 obtains the user input corresponding to, and specifying or defining, the physical arrangement via the user interface 400. This information may then be used by the mapping logic 113 to provide the set of visual objects 401 where the visual objects correspond to the specified or defined physical arrangement of the plurality of displays 100. Therefore, as illustrated in FIG. 4, the user interface 400 has been used to select the display physical arrangement using the pull down menu 403, and the user interface 400, in response, provided the visual objects 401 arranged as the plurality of displays 100 shown in FIG. 3. That is, the visual objects 401 are arranged in a rectangle having two rows of three columns. In accordance with the embodiments a user is then guided through the display configuration process by the user interface 400.

Figure 5:
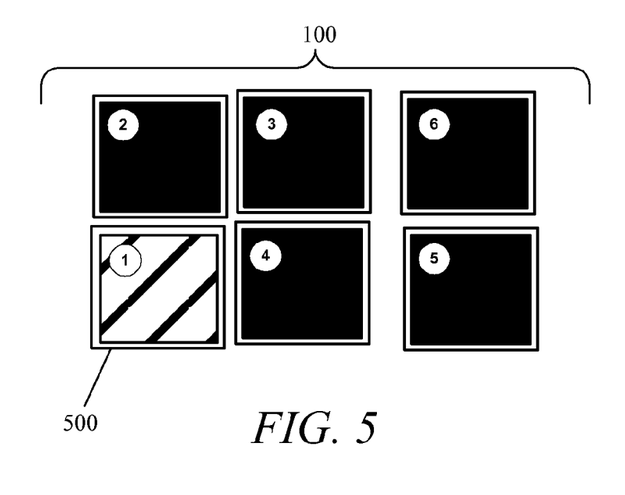
FIG. 5 illustrates the plurality of displays 100 wherein one of the displays is provided with a visual indication.
Figure 6:
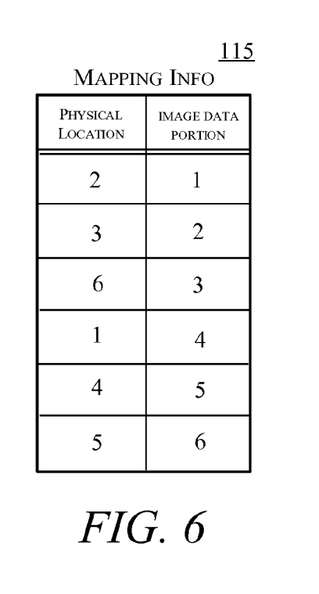
FIG. 6 is a table illustrating mapping information that is created by a mapping logic of the various embodiments wherein image data portions stored by the frame buffer are mapped to displays in the physical positions forming the arrangement of a plurality of displays.
Figure 7:
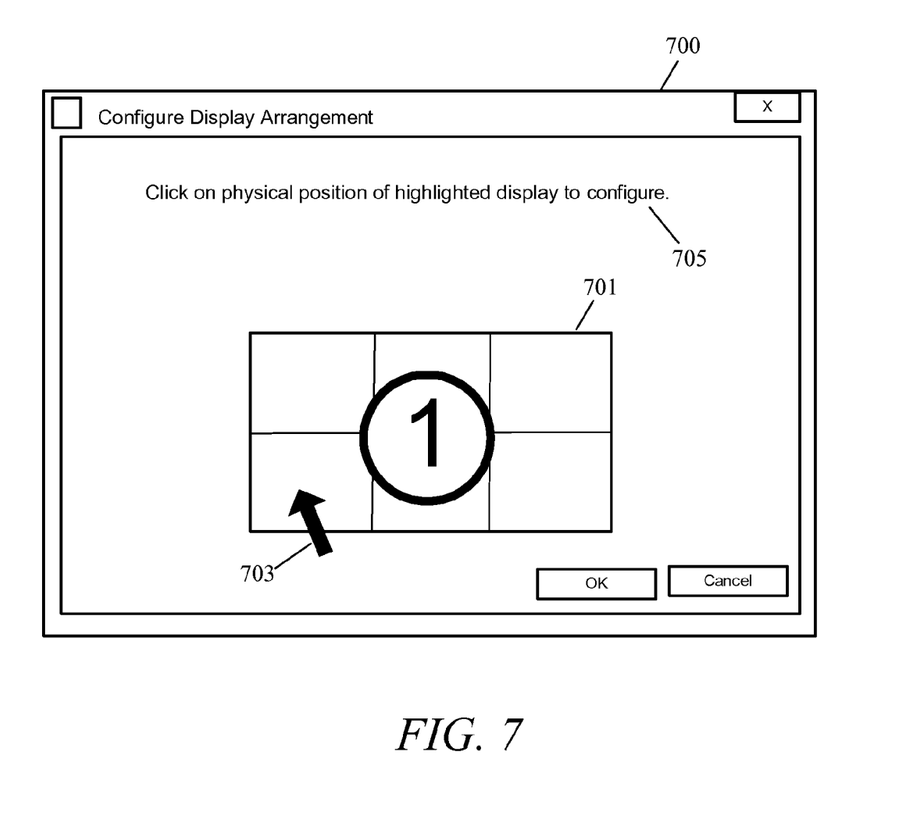
FIG. 7 illustrates a user interface provided so that a user may enter the physical position information, and thereby indicate the physical position in an arrangement, for each of the displays.

For example, the plurality of displays 100 may be initially blanked out (that is, for example, having all area of the display screen colored black). This may be accomplished in some embodiments by placing the displays in a standby mode such that no power is applied to the display screen. A visual indication for one of the displays may then be provided, such as lighting one of the displays (for example possibly bringing the display out of standby) or changing the background color. The visual indication may be achieved in a variety of suitable ways in accordance with the embodiments, such as, but not limited to, "blanking out" the displays by coloring them black while leaving other displays "lit," "lighting" a display by changing the background to a single solid color, or to a pattern, or by providing an image within a portion of the display screen, or by any other suitable approach. For example, an LED on the frame of the display may be lit to indicate that the specific display is currently selected. An exemplary indication that a display has been activated, or has been selected for configuration, is illustrated generally in FIG. 5. In FIG. 5 all of the displays are shown blanked out except the display 500 of the lower left hand corner which is illuminated with a pattern. The pattern is an example of a visual indication that the display 500 is activated or selected. As was discussed earlier, the lower left hand display 500 is connected, in the example of FIG. 1, to connector port 001. Therefore, to facilitate understanding of the present embodiment, the display 500 is shown having the numerical reference 1. FIG. 7 shows the user interface 700 and illustrates how the user may select the illuminated display 500 (i.e. the activated or selected display) graphically on the visual object representation 701. That is, when the display 500 is illuminated as shown in FIG. 5, the user may respond by, for example, positioning the cursor 703 over the corresponding visual object corresponding to the display 500 location, which is in this case, the lower left hand corner. In some embodiments, making the selection of the visual object corresponding to the display 500 will render that visual object unselectable going forward. In response to the user selection, the mapping logic 113 maps the display 500, which also corresponds to display connector 001, to the logical image data portion 4. This is illustrated by the mapping information 115 shown in FIG. 6. After the user has selected the first display the user interface 700 then waits for the user to select a second display in response to illumination of another one of the displays as illustrated in FIG. 5. That is, the next display of the arrangement is activated or selected as indicated by the visual indication. For example, the mapping logic may cause the display in the upper left hand corner, which is connected to display connector 002, to be illuminated. The user would then select the corresponding visual object on the visual objects 701 and the mapping logic would map the display and physical location 2 to the frame buffer 117 logical image data portion 1. The mapping info 115 shown in FIG. 6 provides the frame buffer 117 logical image data portion numbers on the right hand column, and the display physical positions on the left hand column. Because there are only six displays, the user interface 700 only has to guide the user through designation of five physical positions. The last position would then be known by process of elimination. Therefore, in accordance with the presently described embodiment, the user must make five visual object selections. It is to be understood that the user interface illustrated in FIG. 7, and also in FIG. 4, show the visual objects as cells within a grid. In FIG. 7 for example, the grid of cells are arranged in a rectangle that corresponds to the physical arrangement of the plurality of displays 100. However the visual objects need not be a grid of cells and could be any visual objects such as but not limited to, two dimensional geometric shapes, three dimensional geometric shapes, characters, etc.

The mapping logic 113 provides various outputs to operate the plurality of displays 100 in accordance with the discussion above. For example, the mapping logic 113 output will send any needed commands, for example via the CPU 109 in some embodiments, to any other necessary logic of the apparatus 101, such that the displays will respond appropriately. For example, the mapping logic 113 may send commands to display drivers to "blank out" or illuminate any display of the plurality of displays 100 as needed. Further, the mapping logic 113 receives various inputs such as, but not limited to, user input (such as from user interfaces 121), input from an application or from an operating system, etc.

Figure 8:
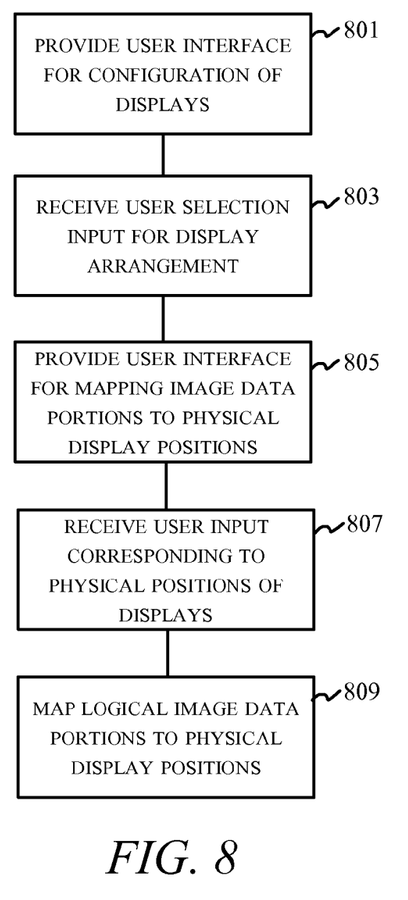
FIG. 8 is a flowchart illustrating an operation of the various embodiments.
Figure 9:
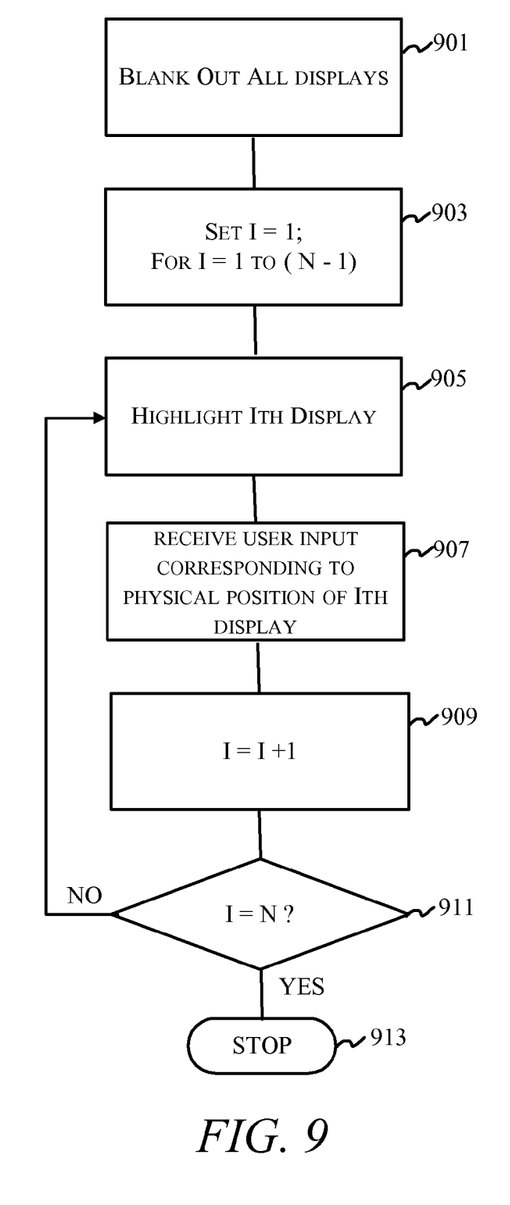
FIG. 9 is a flowchart illustrating operation of one embodiment.

The operation of the embodiment that was just described is summarized by the flowchart of FIG. 9. The general operation of all of the embodiments is described by the flowchart of FIG. 8. For example, in 801, a user interface is provided for configuration of displays. The user interface receives user selection input for the display arrangement in 803. For example, the user may indicate that the displays are arranged in a rectangular pattern having two rows and three columns. Next, in 805, a user interface is provided for mapping logical displays to physical display position, i.e. mapping the image data portions of the frame buffer to the correct displays of the physical arrangement. The "logical display" corresponds to an initial default mapping and corresponds to the logical image data portion of the frame buffer and/or also the physical connector port on a plurality of connector ports such as the plurality of connector ports 103 illustrated in FIG. 1. In 807, a user input is received corresponding to the physical position of the displays and in 809 the display positions are mapped to the logical image data portions of the frame buffer. As mentioned above, FIG. 9 corresponds to the embodiment described with respect to FIGS. 5 and 7. For example in 901 all displays may be blanked out. An index "i" may be set to 1, where the index reaches a maximum at the number of displays in the physical arrangement, minus 1. That is, one less display than the number of displays in the physical arrangement need be designated by the user. In 905 the ith display is highlighted. As shown in 907, a user input is obtained corresponding to the physical position of the ith display. In 909 the index i is incremented by 1. And, in 911, if the index is equal to the number of displays the process stops as shown in 913. However, if the index is still less than the number of displays, the next display, that is, the "ith" display, is highlighted and the process continues until n−1 displays have been designated by the user.

An alternative embodiment will now be described. Returning again to FIG. 2 and FIG. 3, the index numbers shown in the upper left hand corner of the plurality of displays 100 may be actually displayed to the user. For example, the numbers shown on the displays in FIG. 3 may be actually displayed as shown. In that case the user may respond by, for example, typing the sequence of the numbers into the user interface 700. For example, if the numbers displayed in FIG. 3 were shown to the user, the user would type in the sequence 2, 3, 6, 1, 4, 5. The mapping logic 113 would then use the sequence entered by the user to create the mapping info 115 as illustrated in FIG. 6. The mapping logic 113 may also use a specified or defined arrangement such that the number of columns and rows of a rectangular arrangement are also known and are used in conjunction with the user entered sequence of numerical values. The arrangement may be entered by the user as was discussed above.

Figure 10:
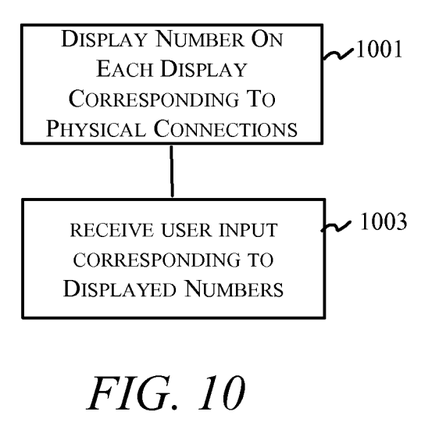
FIG. 10 is a flowchart illustrating operation of another embodiment.

This method of operation where the user enters in a displayed sequence of values is illustrated by the flowchart of FIG. 10. In 1001, a display number is displayed on each display corresponding to, for example, the physical connection of the display. In 1003, user input is received corresponding to the displayed numbers. For example the user may enter the sequence of the numbers displayed as was described above.

Figure 11:
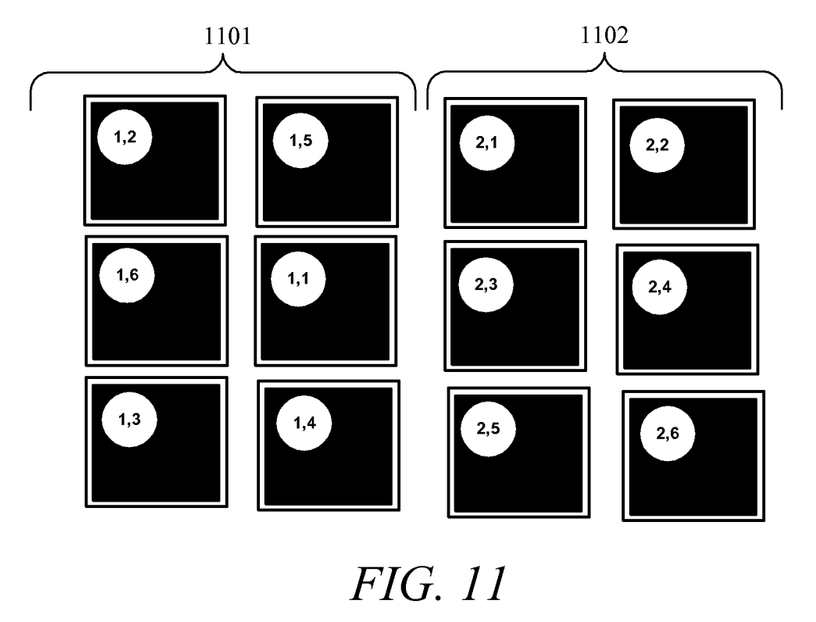
FIG. 11 is a diagram illustrating multi-graphics processing unit operation wherein two arrangements of displays are each associated with a corresponding graphics processing unit.

FIG. 11 illustrates two sets of displays, set 1101 and set 1102, wherein each of the two sets of displays is connected to a separate graphics processing unit. For example, the apparatus 101 may be a computer that includes multiple graphics processing units. The graphics processing units may be on a single PC board or may be each on their own individual graphics processing card where the graphics processing cards communicate by a communication bus. Regardless of the physical arrangement of the graphics processing units, the mapping logic 113 operates in a similar way to what has been described above with respect to a single graphics processing unit. For example, the user interface may prompt the user for input corresponding to the physical arrangement of the two sets of displays 1101 and 1102. In the example of FIG. 11, the two sets of displays are arranged in rectangular arrangements each having three rows and two columns. The display set 1101 is connected to a first graphics processing unit and thus the index numbers shown correspond to the physical port of the first graphics processing unit. For example, the upper left hand corner is display 2 connected to graphics processing unit 1 (i.e. port "(1,2)") while the display in the lower left hand corner is the third display connected to graphics processing unit 1 (i.e. port "(1,3)"). In this case, the user interface may prompt the user to designate the physical location of each monitor connected to graphics processing unit 1. The user interface may subsequently prompt the user to designate the physical location of the displays connected to graphics processing unit 2. The mapping logic 113 may then create a mapping info 115 which maps the logical image data portions of the frame buffer to the overall physical arrangement illustrated in FIG. 11 which represents a larger rectangle having three rows with four columns each. Therefore the various embodiments herein disclosed are suitable for accommodating various physical arrangements of displays even where multiple graphics processing units are connected to multiple sets of physically arranged displays. Further, although exemplary rectangular arrangements have been used for purposes of explanation, other shapes may also be accommodated by the various embodiments herein disclosed.

Therefore apparatuses and methods have been disclosed herein which allow user configuration of single large surface (SLS) mode display groups. Exemplary embodiments have been described having an apparatus with six connector ports for operative connection to a group of six displays. However the embodiments herein disclosed are not to be construed as limited to six displays. As was discussed above, the apparatuses and methods described herein may also be applied to multiple graphics processing units' configuration wherein each graphics processing unit is connected to a set of six monitors for example. Various other arrangements and configurations of displays and/or graphics processing units connected to sets of displays may be envisioned by those of ordinary skill in the art as being contemplated by the embodiments herein disclosed and in accordance with the following claims.

What is claimed is:

1. A method comprising:
providing, by mapping logic, output to a selected display of a plurality of displays forming an arrangement, said selected display providing a visual indication in response to said output, said visual indication indicating that said selected display is ready to be mapped to an image data portion corresponding to said selected display's physical position within said arrangement, wherein said output is provided to each display of said plurality of displays in a sequence, and wherein each display to which said output is directed is said selected display when providing said visual indication;
obtaining an input indicating said selected display's physical position for each display of said plurality of displays in order corresponding to said sequence; and
mapping, by said mapping logic, said image data portion to said selected display, said image data portion being stored in a frame buffer, said mapping being in response to said input indicating said selected display's physical position, wherein said frame buffer stores a single large surface image as a plurality of image data portions, each image data portion being mapped to a corresponding display of said plurality of displays.

2. The method of claim 1, comprising:
providing a user interface on at least one display of said plurality of displays, wherein said user interface includes a plurality of visual objects, wherein each visual object of said plurality of visual objects corresponds to a display of said plurality of displays and wherein said plurality of visual objects is arranged to correspond with said arrangement of said plurality of displays; and
obtaining said input corresponding to selection of a visual object of said plurality of visual objects, said visual object corresponding to said selected display's physical position within said arrangement.

3. The method of claim 2, further comprising:
obtaining input defining said arrangement of said plurality of displays; and
providing said plurality of visual objects wherein said plurality of visual objects are arranged to correspond with said arrangement.

4. The method of claim 1, wherein said selected display provides a visual indication in response to said output, wherein said visual indication comprises one of:
lighting said selected display or changing background color of said selected display.

5. The method of claim 4, further comprising:
providing a first output to blank out all displays of said plurality of displays prior to providing said output to said selected display for providing said visual indication.

6. The method of claim 3, comprising:
providing said plurality of visual objects as a grid of cells, wherein each cell in said grid of cells is a visual object and corresponds to a physical position of a display of said plurality of displays; and
obtaining said input corresponding to selection of a cell of said grid of cells, said cell corresponding to said physical position of said selected display.

7. The method of claim 1, wherein said visual indication includes providing a unique alphanumeric character on each display of said plurality of displays at the same time such that all displays are selected displays, each said alphanumeric character corresponding to an initial frame buffer mapping of a corresponding display on which said alphanumeric character is displayed.

8. The method of claim 7, comprising:
receiving a string of alphanumeric characters as said input, wherein said string is in order of physical arrangement of said plurality of displays.

9. An apparatus comprising:
at least one processor comprising mapping logic operative to:
provide a configuration interface for a plurality of displays forming an arrangement, and provide output to a selected display of said plurality of displays, said selected display providing a visual indication in response to said output, said visual indication indicating that said selected display is ready to be mapped to a single large surface image data portion corresponding to said selected display's physical position within said arrangement, said output being provided to each display of said plurality of displays in a sequence, and wherein each display to which said output is directed is said selected display when providing said visual indication;
obtain an input corresponding to said selected display's physical position for each display of said plurality of displays in order corresponding to said sequence; and
map said image data portion to said selected display in response to said input indicating said selected display's physical position, said image data portion being stored in a frame buffer, wherein said frame buffer stores an image as a plurality of image data portions, each image data portion being mapped to a corresponding display of said plurality of displays.

10. The apparatus of claim 9, further comprising:
a plurality of physical display connectors, operatively connected to said mapping logic, said plurality of display connectors being operative to connect to said plurality of displays, each connector corresponding to a display being initially mapped, as a default mapping, to one of said image data portions of said frame buffer.

11. The apparatus of claim 9, wherein said mapping logic is operative to:
provide a user interface on at least one display of said plurality of displays, wherein said user interface includes a plurality of visual objects, wherein each visual object of said plurality of visual objects corresponds to a display of said plurality of displays and wherein said plurality of visual objects is arranged to correspond with said arrangement of said plurality of displays; and
obtain said input corresponding to selection of a visual object of said plurality of visual objects, said visual object corresponding to said selected display's physical position within said arrangement.

12. The apparatus of claim 11, wherein said mapping logic is operative to:
obtain input defining said arrangement of said plurality of displays; and
provide said plurality of visual objects wherein said plurality of visual objects are arranged to correspond with said arrangement.

13. The apparatus of claim 9, wherein said selected display provides a visual indication in response to said output by one of lighting said selected display or changing background color of said selected display.

14. The apparatus of claim 9, wherein said mapping logic is operative to provide a first output to blank out all displays of said plurality of displays, prior to providing said output to said selected display to provide said visual indication.

15. The apparatus of claim 11, wherein said mapping logic is operative to:
provide said plurality of visual objects as a grid of cells, wherein each cell in said grid of cells is a visual object and corresponds to a physical position of a display of said plurality of displays; and
obtain said user input corresponding to a user selection of a cell of said grid of cells, said cell corresponding to said physical position of said display.

16. The apparatus of claim 9, wherein said visual indication includes display of a unique alphanumeric character on each display of said plurality of displays, such that all displays are selected displays, each said alphanumeric character corresponding to an initial frame buffer mapping of a corresponding display on which said alphanumeric character is displayed.

17. The apparatus of claim 16, wherein said mapping logic is operative to obtain a string of alphanumeric characters as said user input, wherein said string is in order of the physical arrangement of said plurality of displays.

18. A non-transitory computer readable memory comprising:
executable instructions for execution by at least one processor, that when executed cause said at least one processor to:
provide a configuration interface for a plurality of displays forming an arrangement, and provide output to a selected display of said plurality of displays, said selected display providing a visual indication in response to said output, said visual indication indicating that said selected display is ready to be mapped to an image data portion corresponding to said selected display's physical position within said arrangement, said output being provided to each display of said plurality of displays in a sequence, and wherein each display to which said output is directed is said selected display when providing said visual indication;
obtain an input corresponding to said selected display's physical position for each display of said plurality of displays in order corresponding to said sequence; and
map said image data portion to said selected display in response to said input indicating said selected display's physical position, said image data portion being stored in a frame buffer, wherein said frame buffer stores a single large surface image as a plurality of image data portions, each image data portion being mapped to a corresponding display of said plurality of displays.

19. The non-transitory computer readable memory of claim 18, wherein said executable instructions, when executed further cause the one or more processors to:
provide a user interface on at least one display of said plurality of displays, wherein said user interface includes a plurality of visual objects, wherein each visual object of said plurality of visual objects corresponds to a display of said plurality of displays and wherein said plurality of visual objects is arranged to correspond with said arrangement of said plurality of displays; and
obtain said input corresponding to selection of a visual object of said plurality of visual objects, said visual object corresponding to said selected display's physical position within said arrangement.

20. The non-transitory computer readable memory of claim 19, wherein said executable instructions, when executed further cause the one or more processors to:
obtain input defining said arrangement of said plurality of displays; and
provide said plurality of visual objects wherein said plurality of visual objects are arranged to correspond with said arrangement.

21. The non-transitory computer readable memory of claim 19, wherein said executable instructions, when executed further cause the one or more processors to:
provide said plurality of visual objects as a grid of cells, wherein each cell in said grid of cells is a visual object and corresponds to a physical position of a display of said plurality of displays; and
obtain said user input corresponding to a user selection of a cell of said grid of cells, said cell corresponding to said physical position of said display.

22. The non-transitory computer readable memory of claim 18, wherein said executable instructions, when executed further cause the one or more processors to:
provide an output to each display of said plurality of displays to provide said visual indication including display of a unique alphanumeric character on each display of said plurality of displays, such that all displays are selected displays, each said alphanumeric character corresponding to an initial frame buffer mapping of a corresponding display on which said alphanumeric character is displayed.

23. The non-transitory computer readable memory of claim 22, wherein said executable instructions, when executed further cause the one or more processors to:
obtain a string of alphanumeric characters as said input, wherein said string is in order of the physical arrangement of said plurality of displays.

* * * * *